US012811255B2

(12) United States Patent
North et al.

(10) Patent No.: US 12,811,255 B2
(45) Date of Patent: Nov. 24, 2026

(54) MANUFACTURING A BATTERY PACK USING A WELDING JIG

(71) Applicant: TELO TRUCKS INC., San Francisco, CA (US)

(72) Inventors: Forrest Jean North, Redwood City, CA (US); David Osman Doluca, Saratoga, CA (US)

(73) Assignee: TELO TRUCKS INC., San Francisco, CA (US)

( * ) Notice: Subject to any disclaimer, the term of this patent is extended or adjusted under 35 U.S.C. 154(b) by 1268 days.

(21) Appl. No.: 17/542,190

(22) Filed: Dec. 3, 2021

(65) Prior Publication Data

US 2022/0181752 A1 Jun. 9, 2022

Related U.S. Application Data

(60) Provisional application No. 63/121,544, filed on Dec. 4, 2020.

(51) Int. Cl.
*H01M 10/04* (2006.01)
*B23K 26/21* (2014.01)
(Continued)

(52) U.S. Cl.
CPC ........... *H01M 50/516* (2021.01); *B23K 26/21* (2015.10); *B23K 26/322* (2013.01); (Continued)

(58) Field of Classification Search
CPC ............ B23K 37/0443; H01M 50/516; H01M 2220/20; H01M 50/249
See application file for complete search history.

(56) References Cited

U.S. PATENT DOCUMENTS 3,923,697 A * 12/1975 Ellis ......................... H01B 1/00 106/287.18
11,145,928 B2 * 10/2021 Guillemard ......... H01M 50/394
(Continued)

FOREIGN PATENT DOCUMENTS

CN 20269598 U * 1/2013
CN 202695598 U 1/2013
(Continued)

OTHER PUBLICATIONS

International Search Report and Written Opinion dated Apr. 13, 2022 for International Patent Application No. PCT/US2021/061868.

(Continued)

*Primary Examiner* — Ibrahime A Abraham
*Assistant Examiner* — Lawrence H Samuels
(74) *Attorney, Agent, or Firm* — AMPACC Law Group, PLLC

(57) ABSTRACT

Various embodiments directed to manufacturing a battery assembly or battery pack are described. In some embodiments, the manufacturing process utilizes a welding jig to facilitate the placement and disposition of cell connection materials to battery cells when forming a battery assembly or pack. Using the jig, the connection materials can be fused to the cells using a laser welding process. In doing so, the process enables certain materials, typically unsuitable for welding processes (e.g., spot welding) to be utilized as connection materials between cells.

13 Claims, 18 Drawing Sheets

(51) Int. Cl.

| | |
|---|---|
| ***B23K 26/322*** | (2014.01) |
| ***B23K 37/04*** | (2006.01) |
| ***H01M 10/0525*** | (2010.01) |
| ***H01M 50/204*** | (2021.01) |
| ***H01M 50/516*** | (2021.01) |
| ***H01M 50/522*** | (2021.01) |
| ***H01M 50/526*** | (2021.01) |
| *B23K 101/38* | (2006.01) |

(52) U.S. Cl.

CPC ..... *B23K 37/0443* (2013.01); *H01M 10/0525* (2013.01); *H01M 50/204* (2021.01); *H01M 50/522* (2021.01); *H01M 50/526* (2021.01); *B23K 2101/38* (2018.08)

(56) References Cited

U.S. PATENT DOCUMENTS

| | | | | |
|---|---|---|---|---|
| 2006/0177734 | A1* | 8/2006 | Yao | H01M 50/505<br>429/468 |
| 2018/0166660 | A1* | 6/2018 | Kim | H01M 50/591 |
| 2019/0088990 | A1* | 3/2019 | Sastry | H01M 10/0431 |
| 2019/0181403 | A1* | 6/2019 | Gu | H01M 50/30 |
| 2019/0252652 | A1* | 8/2019 | Guillemard | B64D 45/00 |
| 2019/0326623 | A1* | 10/2019 | Torosyan | H01M 50/50 |
| 2020/0168962 | A1* | 5/2020 | Schlunke | B32B 3/08 |

FOREIGN PATENT DOCUMENTS

| | | | | |
|---|---|---|---|---|
| CN | 108067801 | A | | 5/2018 |
| CN | 207800739 | U | | 8/2018 |
| CN | 109103405 | A | | 12/2018 |
| CN | 210359818 | U | * | 4/2020 |
| EP | 1186370 | A2 | | 3/2002 |
| EP | 3192111 | B1 | | 12/2018 |
| KR | 20180083129 | A | * | 7/2018 |

OTHER PUBLICATIONS

The European search report dated Apr. 28, 2025, for European Patent Application No. 20901557.5.

* cited by examiner

MANUFACTURING A BATTERY PACK USING A WELDING JIG

CROSS REFERENCE TO RELATED APPLICATIONS

This application claims priority to U.S. Provisional Patent Application No. 63/121,544, filed on Dec. 4, 2020, entitled BATTERY ASSEMBLY AND MANUFACTURING PROCESS, which is hereby incorporated by reference in its entirety.

BACKGROUND

Various types of electric vehicles, including electric bicycles, scooters, and so on, utilize battery assemblies formed of multiple Lithium-ion (Li-ion) cells. The battery assemblies, or battery packs, incorporate large cylindrical cells, and include connections that connect the cylindrical cells together in series (and sometimes also in parallel).

Common types of electrical connections for Lithium-ion cells include connections that are applied or formed via spot welding, ultrasonic welding, and/or wire bonding techniques. Often, processes utilize a "wear items," such as copper electrodes or steel tips, during the manufacturing process, in order to successfully connect the cells to one another. Such processes often access both the exposed tops and bottoms (e.g., the anodes and cathodes) of the cells during manufacturing.

Materials for inter-cell connections include nickel plated steel, pure nickel, aluminum, and/or copper. While the processes can utilize these materials, certain processes, such as those that incorporate spot welding techniques, can become increasingly difficult when using the more conductive materials, such as copper. Thus, currently the mass production of battery assemblies is often realized through cheap labor and/or the manual assembly of the cells within the assemblies, using a spot-welding technique with nickel plated steel or pure nickel as the conductive material.

These and other drawbacks exist with conventional battery assembly and manufacturing processes.

Figure 1:
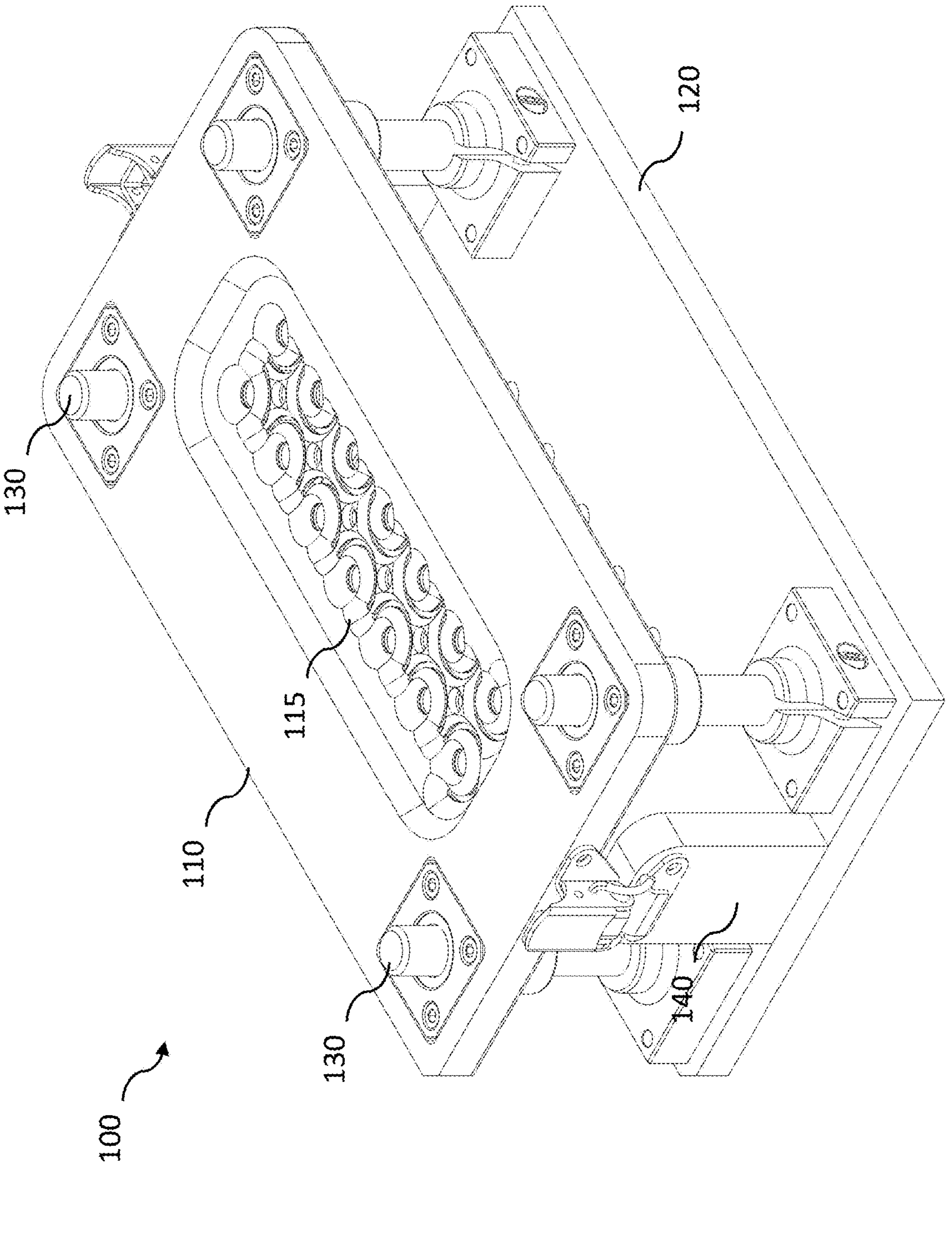
FIG. 1 is a perspective view of a welding jig utilized during a battery pack manufacturing process.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various embodiments directed to manufacturing a battery assembly or battery pack are described. In some embodiments, the manufacturing process utilizes a welding jig to facilitate the placement and disposition of cell connection materials to battery cells when forming a battery assembly or pack. Using the welding jig, the connection materials can be fused to the battery cells (e.g., to top portions of the cells) using a laser welding process. In doing so, the manufacturing process enables certain materials, typically unsuitable for welding processes (e.g., spot welding), to be utilized as connection materials or components that connect battery cells in a battery assembly or pack.

For example, the manufacturing process can include positioning multiple battery cells into a group of battery cells, disposing a foil connector onto a top portion of each battery cell of the group of battery cells, pressing a conforming material onto the disposed foil connector, and welding the foil connector to the group of battery cells. For example, the process can place the battery pack within a welding jig and press the conforming material onto the disposed foil connector using a top plate of the welding jig.

In the following description, for the purposes of explanation, numerous specific details are set forth in order to provide a thorough understanding of implementations of the present technology. It will be apparent, however, to one skilled in the art that various implementations or embodiments of the present technology can be practiced without some of these specific details. The phrases "in some implementations," "according to some implementations," "in the implementations shown," "in other implementations," "in some embodiments," "according to some embodiments," "in the embodiments shown," "in other embodiments," and the like generally mean the particular feature, structure, or characteristic following the phrase is included in at least one implementation or embodiment of the present technology and can be included in more than one implementation or embodiment. In addition, such phrases do not necessarily refer to the same implementations/embodiments or different implementations/embodiments.

Examples of Manufacturing a Battery Pack

In some embodiments, a battery pack or assembly manufacturing process employs a welding jig to facilitate making connections between the individual cells of the battery pack. FIG. 1 is a perspective view of a welding jig 100 utilized during a battery pack manufacturing process.

The welding jig 100 includes a top plate 110 and a bottom plate 120, which sandwich a battery pack through a latch system. The bottom plate 120 and top plate 110 connect and move relative to each other through a set of linear slides 130 or indexing features, which facilitate the movement of the top plate 110 to a specific position above the bottom plate 120. Once positioned, the top plate 110 is secured in position via a clamp 140 or other latching mechanism.

The top plate 110 and bottom plate 120 are formed of a rigid material, such as a metallic material (e.g., steel). The bottom plate 120 is coated with an insulating layer, which separates the plate 120 from battery cells that sit within the welding jig 100. In some cases, a corner of the bottom plate 120 is used to accurately place or guide the welding jig 100 within a laser machine or welding machine.

In some cases, the top plate 110 has an access area 115 that includes angled cutouts, which expose portions of an underlying cell connection material (e.g., a foil connector) to be welded or lased during the manufacturing process of the battery assembly. For example, the angled cutouts of the access area 114 enable a laser to impinge the exposed portions of the cell connection material and be laser welded to the top portions of the battery cells. The cutouts can have angled sides so the laser hits the top portions of the battery cells from various positions and at different angles.

Figure 2:
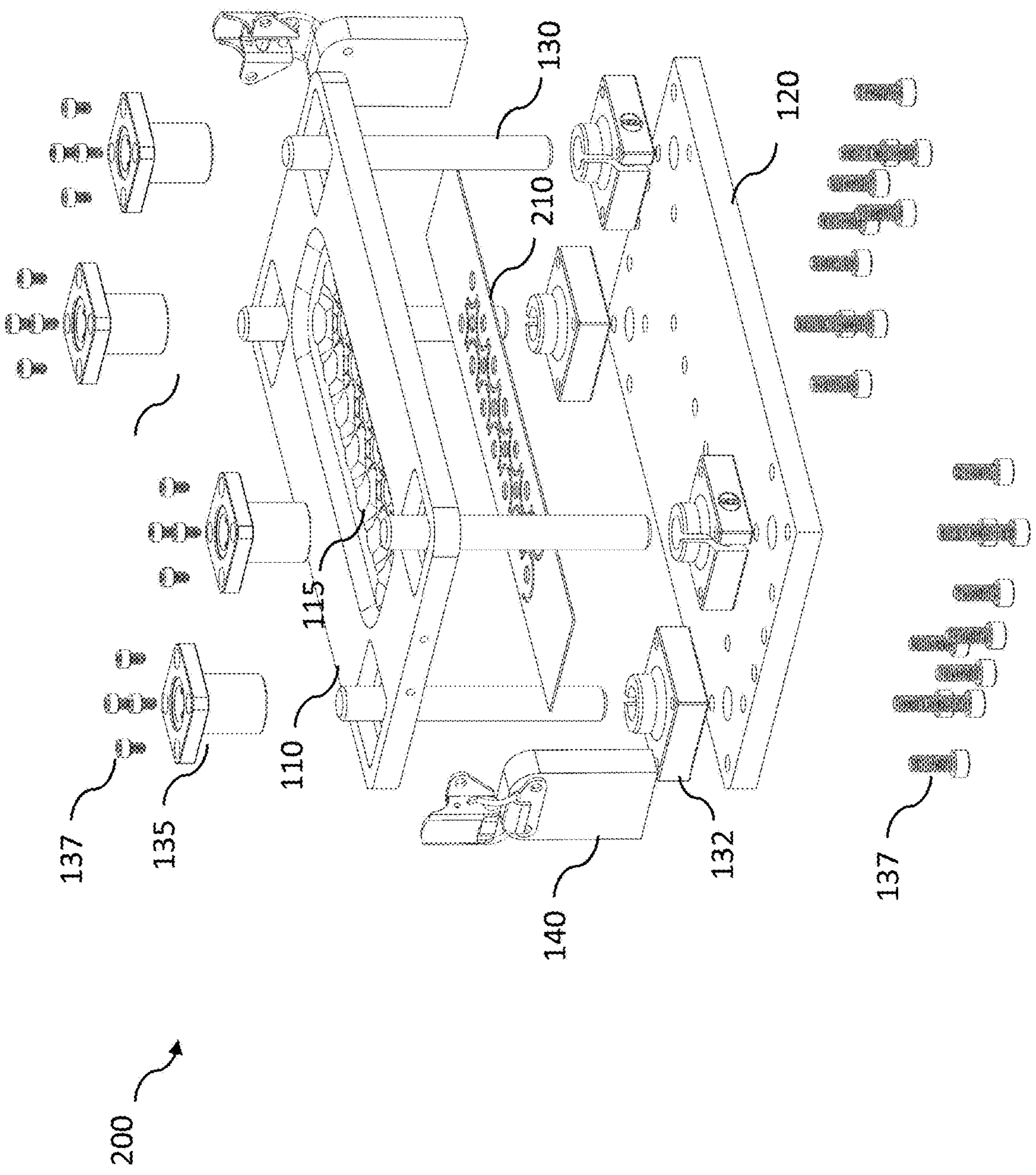
FIG. 2 is an exploded view of the perspective view of the welding jig utilized during a battery pack manufacturing process.

FIG. 2 is an exploded view 200 of the perspective view of the welding jig 100 utilized during the battery pack manufacturing process. As described with respect to FIG. 1, the top plate 110 moves up and down along the linear slides 130, shafts, or guideposts. The slides 130 are fixed to the bottom plate 120 by clamps or feet 132, which are bolted to the bottom plate 120 using bolts 137 or other fasteners. At the top plate 110, the slides 130 extend through bearing blocks 135, or bushings), which are fixed to the top plate 110 via bolts 137. Thus, the top plate 110 can move vertically with little or no horizontal movement, because its movement is guided by the slides 130.

The underside of the top plate 110 has a conforming layer 210, formed of a high temperature tolerant foam or rubber, which conforms to the shape of the top portions of battery cells positioned within the welding jig 100. This conforming material or layer, in some cases, can also form or adapt a shape of the foil material (e.g., the cell connection material) over any curves of the battery cells when the top plate 110 is clamped into place on a battery pack, ensuring each battery cell receives adequate pressure from the top plate 110 during welding.

Figure 3:
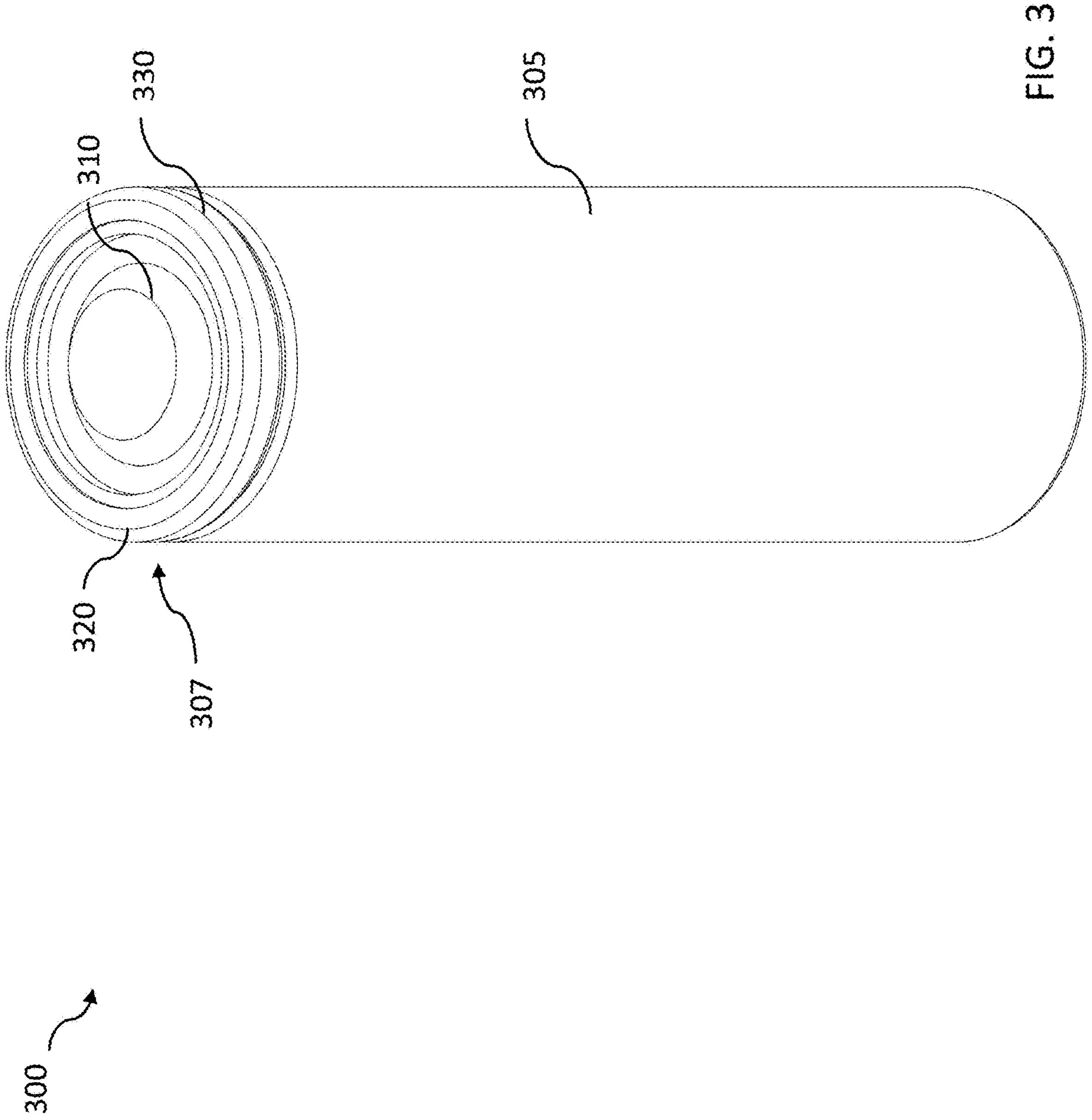
FIG. 3 is a diagram illustrating a battery cell of a battery pack.

FIG. 3 is a diagram illustrating a battery cell 300 of a battery pack. The battery cell 300 includes a cylindrical body 305, and a top portion 307. The top portion 307 is exposed (e.g., there is no surrounding insulating sleeve). The top portion 307 includes a positive button top 310 and a negative case portion 330, separated by an insulating ring 320.

The battery cell 300 can be various types of cells, including Lithium-ion (Li-ion) cells. For example, the battery cell 300 can be a Li-ion cell having an 18650 form factor, where the diameter of the cell is 18 mm, the height of the cell is 65 mm, and the cell is cylindrical. Of course, other battery cells, having different chemistries and/or form factors or shapes, can be connected using the technology described herein.

The battery packs and assemblies described herein can include a range of a total number of cells (e.g., 4-18 cells, or more). Further, the batteries can be connected in series as well as in parallel, and in a variety of configurations. For example, a battery pack can include fourteen battery cells having a voltage of about 3.6V, providing the pack with a total voltage of 48V. Of course, a battery pack can provide other voltages or cell types or capabilities.

Figure 4A:
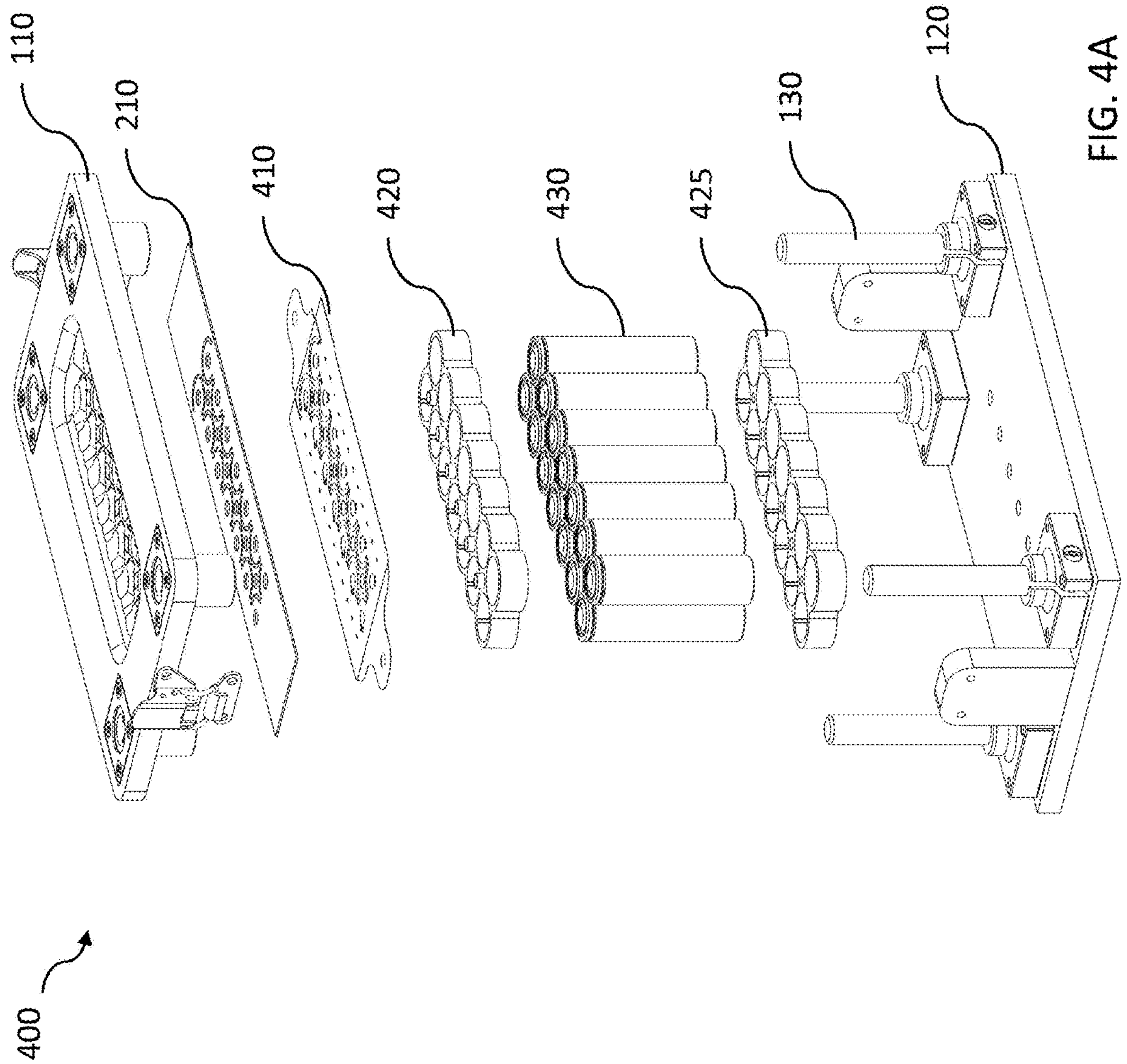
FIGS. 4A-4B are diagrams illustrating a group of battery cells disposed within the welding jig.
Figure 4B:
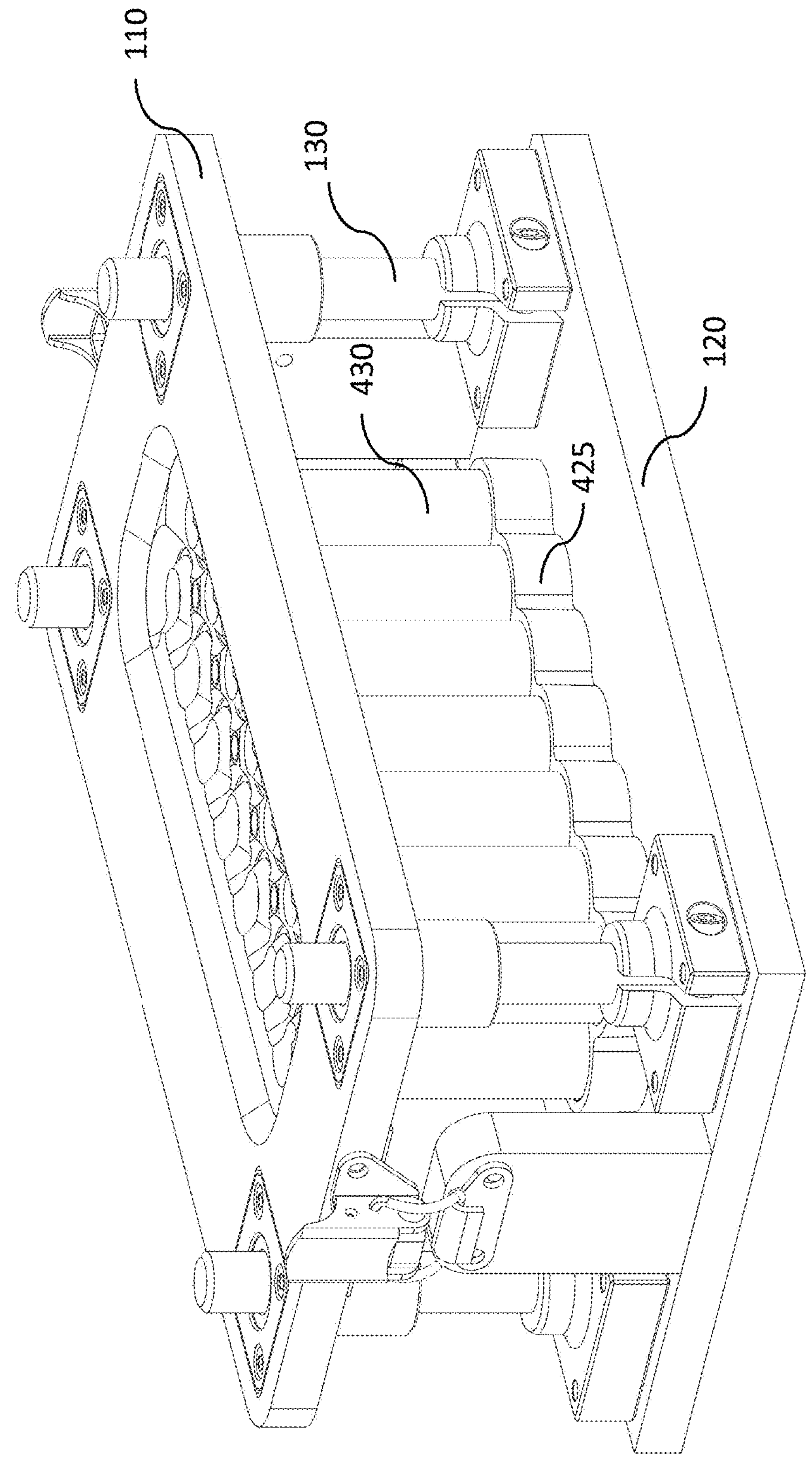

As described herein, the welding jig 100 is utilized to hold and/or secure connection material (e.g., a foil connector) to the top portions of multiple battery cells positioned in the jig 100 during a welding phase of a battery assembly manufacturing process. FIGS. 4A-4B are diagrams illustrating a group of battery cells disposed within the welding jig.

Referring to FIG. 4A, an exploded view depicts various components of the welding jig 100, the battery cells, and the connector foil. Starting from the bottom, the bottom plate 120 has the guideposts, or slides 130, fixed to the plate. A group of battery cells 430 cells are positioned into plastic holders 420, 425, which serve to fix the location of the battery cells 430 within the jig 100, as well as to locate a foil connector 410 at the top of the battery cells 430.

Once the foil connector 410 is positioned onto the battery cells 430, the top plate 110 is moved down towards the battery cells, where the conforming layer 210, disposed under the top plate 210, contacts and is pressed into the foil connector 410. The top plate 110 is then secured in the pressed position, as depicted in FIG. 4B. Thus, when the top plate 110 is latched and the battery pack is fixed into the welding jig 100, the foil connector 410 is pressed into the tops of the battery cells by the conforming material 210, as described herein.

Figure 5:
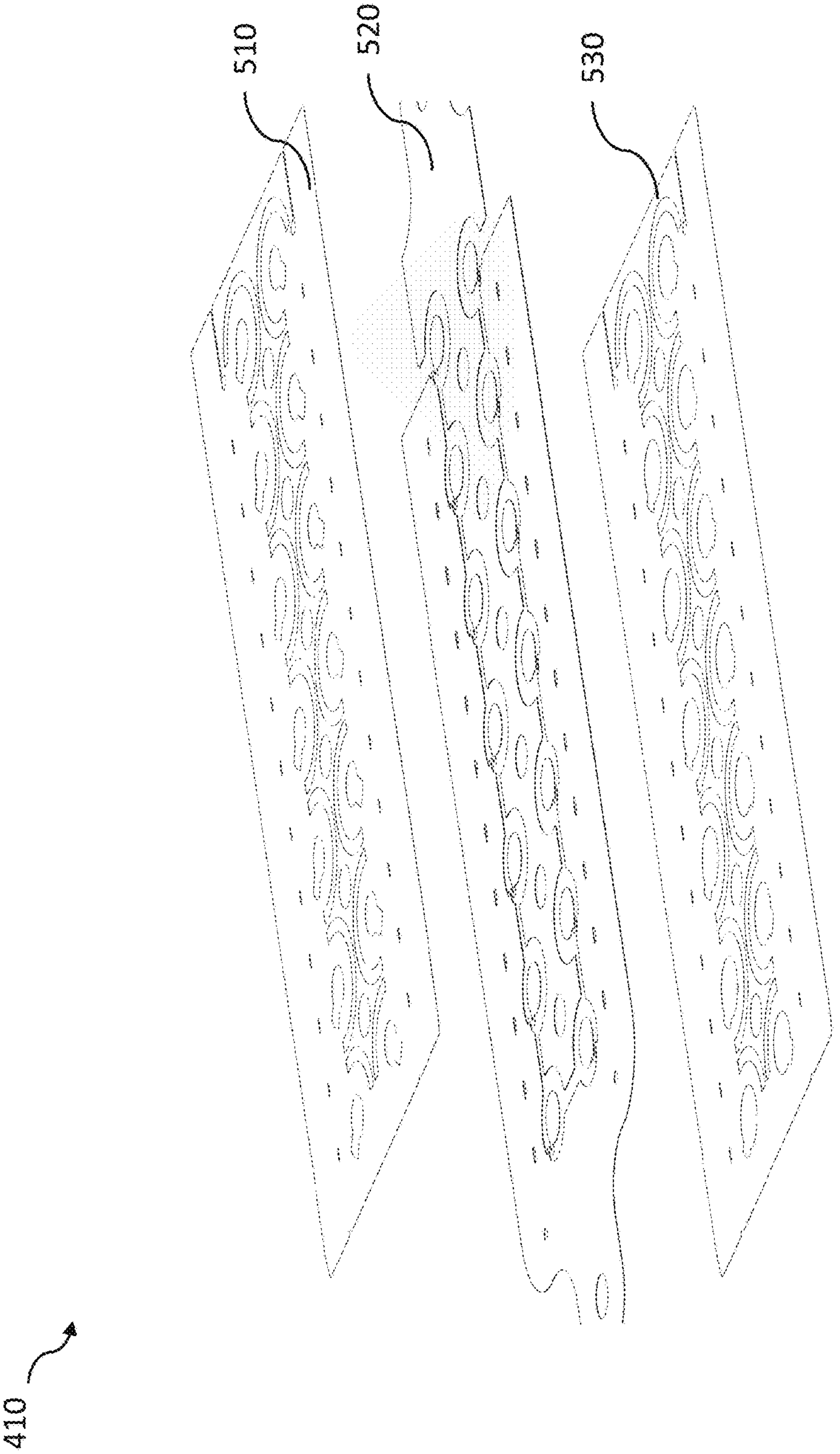
FIG. 5 is a diagram illustrating layers of a foil connector.

FIG. 5 is a diagram illustrating layers of the foil connector 410. The foil connector 410, or connection material or flexible circuit, is configured to provide a conductive link between battery cells of a battery pack, as well as to fuse the battery cells. The foil connector 410, or cell connection material, is made from thin sheets or forms, like a thick foil (e.g., having a thickness of 0.125 to 0.500 mils). The material, which can be pliable or bendable, is cut into a specific shape (e.g., for electrical series parallel connections and voltage isolation) for each application and is bonded to an insulator on both sides. For example, the foil connector can include a conductive foil or layer 520 sandwiched between a top insulating layer 510 and a bottom insulating layer 530.

The insulating layers 510, 530 may include openings that expose the foil 520, such as areas of the foil 520 that are expected to be in contact with the battery cells or with other bonds or connections. In some cases, the foil 520 is formed of copper coated aluminum or copper clad aluminum, which can operate as a fuse material for cell-level fusing within a battery pack.

Figure 6:
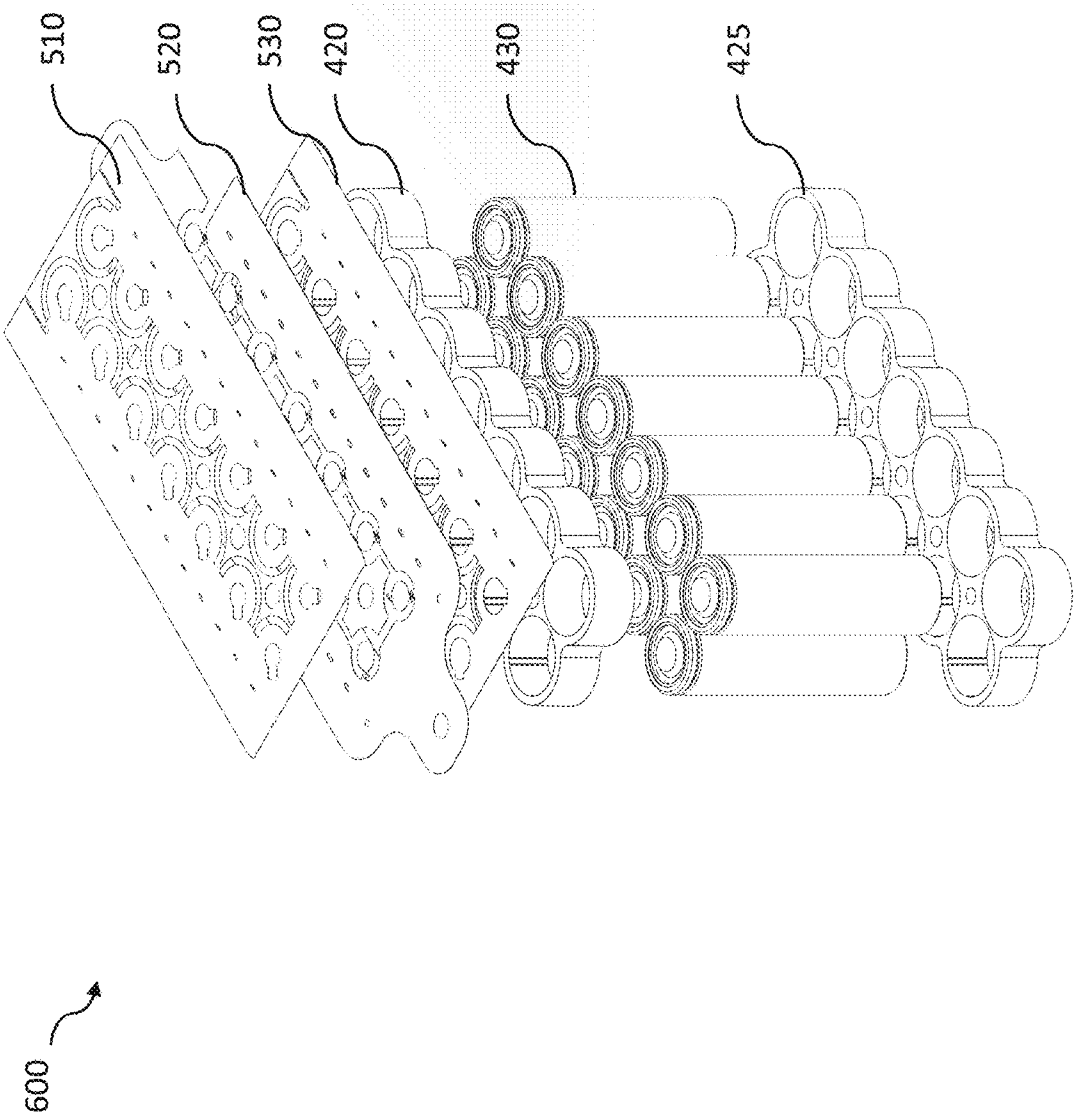
FIG. 6 is an exploded view of the conductive cell materials connected to the battery pack of battery cells.

FIG. 6 is an exploded view 600 of the conductive cell materials and the battery pack of multiple battery cells. As described herein, the battery pack includes the multiple battery cells 430 position together and supported into the holders 420, 425. The foil connector 410 is then placed on top of the battery cells 430. The foil connector 410 includes three layers, the conductive foil or layer 520 (e.g., a foil of copper clad aluminum), and the top insulating layer 510 and the bottom insulating layer 530. The insulating layers 510, 530 may include openings that expose the foil 520, such as areas of the foil 520 that contact the battery cells 410 when placed on top of the battery cells 430 in the welding jig 410.

As described herein, the processed thin metal or thick foil connector 410 is placed on top of the groupings of battery cells 430 within the holders 420, 425 and pressed down with the welding jig 100. The grouping of battery cells 430 and the foil connection 410, in some cases, forms the battery pack. The welding jig 100, and the battery pack placed inside the jig, is then placed into a laser projection machine at a set location. Via the machine, the foil connector 410 is then fused to the top of the cell (e.g., fused to both the positive button top 310 and the negative case 330) and exposed using an application specific pattern that the laser follows.

Figure 7A:
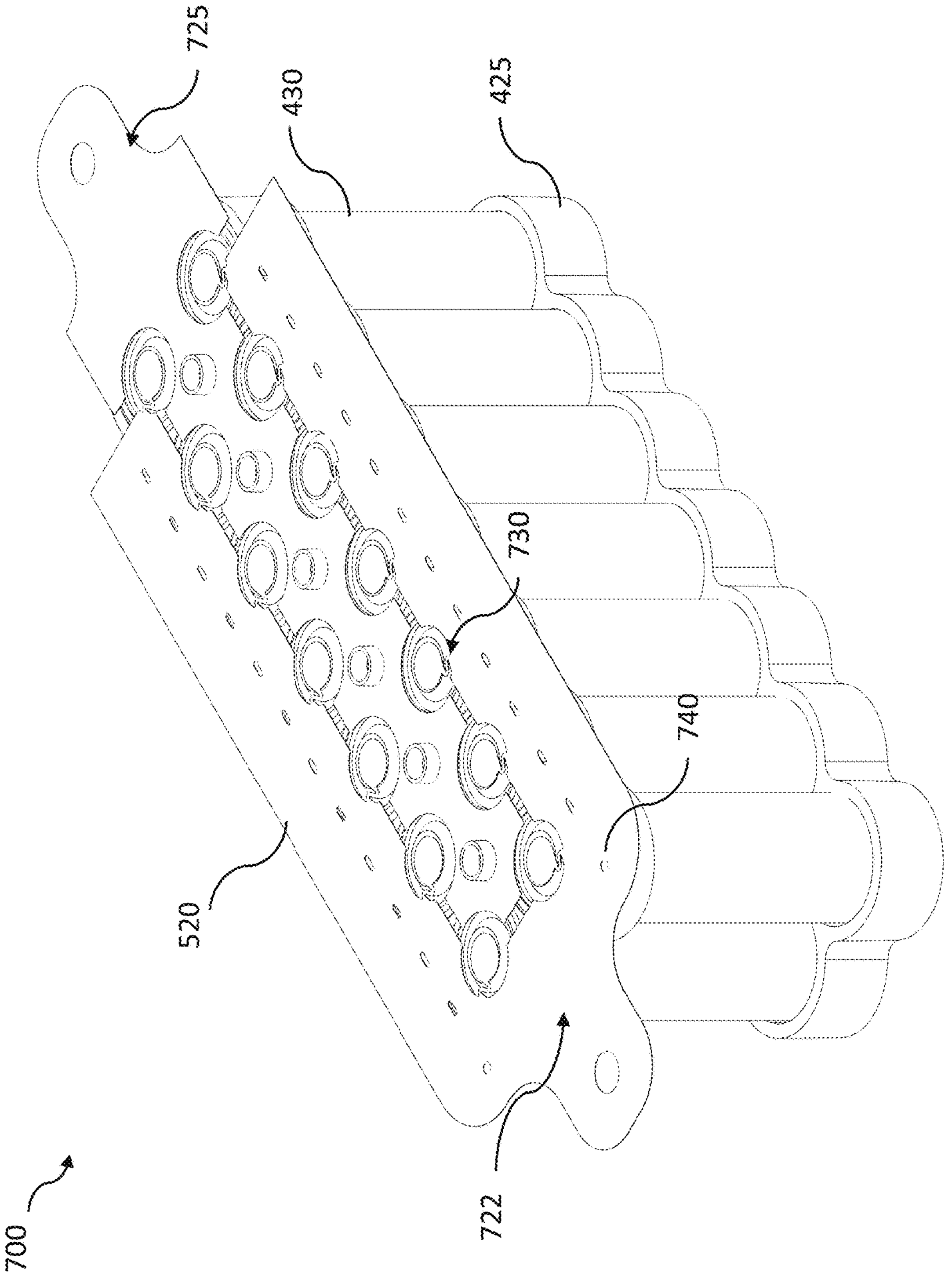
FIGS. 7A-7C are diagrams illustrating the connection of the conductive cell material to the battery cells.
Figure 7B:
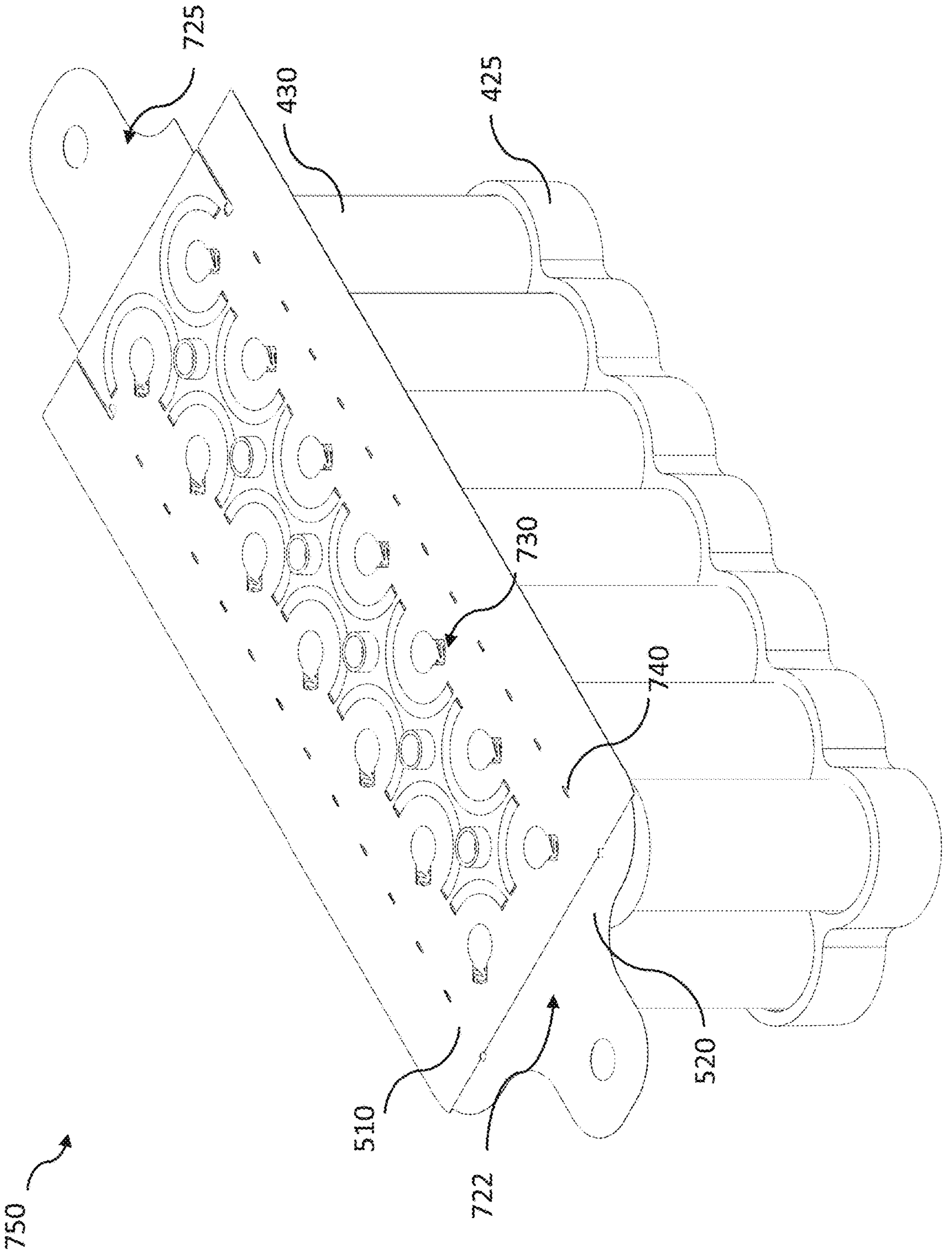
Figure 7C:
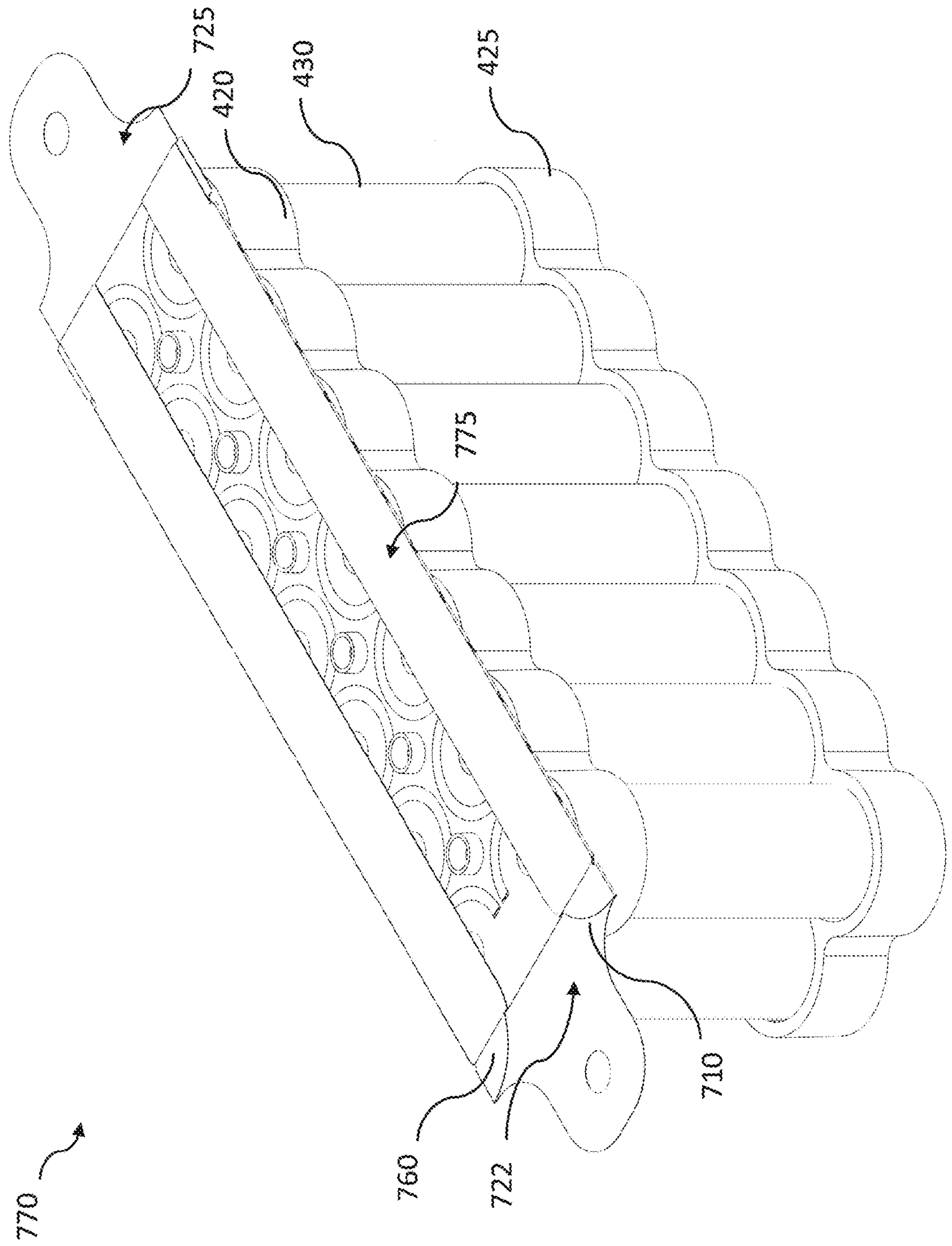

FIGS. 7A-7C are diagrams illustrating the connection of the conductive cell material to the battery cells. FIG. 7A is a diagram 700 that shows the conductive foil 520 placed on top of the battery cells 430 (with the insulating layer 530 underneath the foil 520). In the diagram 700, the top insulating layer is not shown in order to depict certain details of the conductive foil 520 after laser welding (and fusing). However, as shown in FIG. 7B, the top insulating layer 510 is shown as being disposed onto the conductive foil 520.

The conductive foil 520, as shown in FIG. 7A, has a positive terminal or end 722 and a negative terminal or end 725. Once the battery pack is welded, the pack can exhibit various beneficial characteristics. Because the foil 520 is only on the top of the battery cells 430, the cells are oriented in the same direction, regardless of their position within the pack. Further, the cells do not have a foil connector on the traditionally negative underside of the cell, thus allowing for a good thermal transfer between the cell and a potential heatsink surface. The additional heat sinking can reduce the possibility of spontaneous thermal runaway within the assembled battery pack. Thus, both passive and active thermal management solutions can be more effective using the process described herein, because the heat sink has a better pathway to the thermal mass of the battery cell.

Further, the foil 520 can include a fuse 730 at each battery cell. These fuses 730 can prevent possible catastrophic failure in the case of internal or external short circuit events (e.g., events due to incorrect assembly, trauma or pack enclosure punctures) at the cells.

The foil 520 also includes fold lines or relief holes 740, which facilitate the folding of the layers 510, 520, 530 after welding. As shown, the layers may fold towards the middle part of the pack (over the welded cells), or the layers can be folded down the sides of the pack (parallel to the cells 430).

Figure 8A:
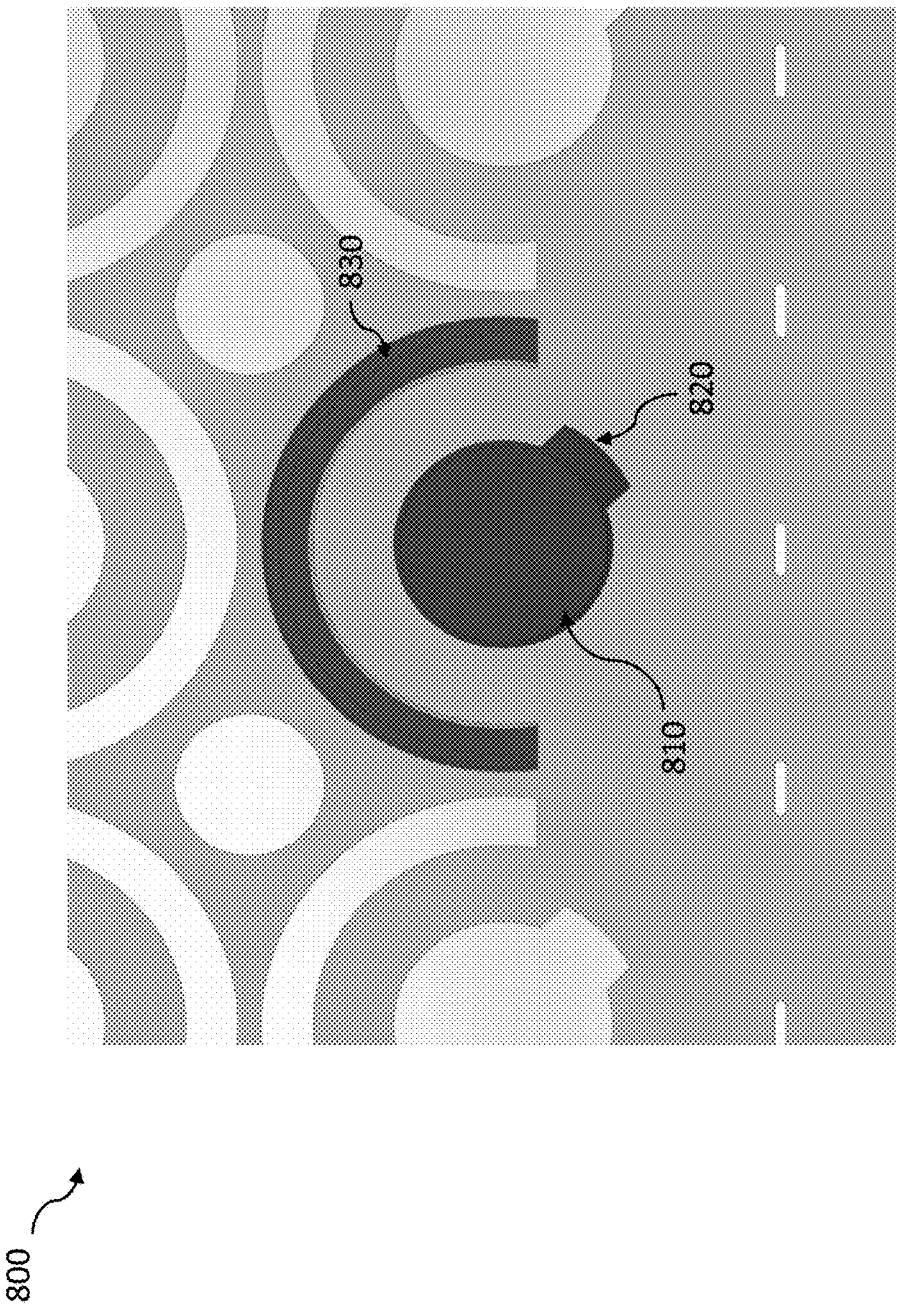
FIGS. 8A-8B are diagrams illustrating the welding and fusing of a battery cell.
Figure 8B:
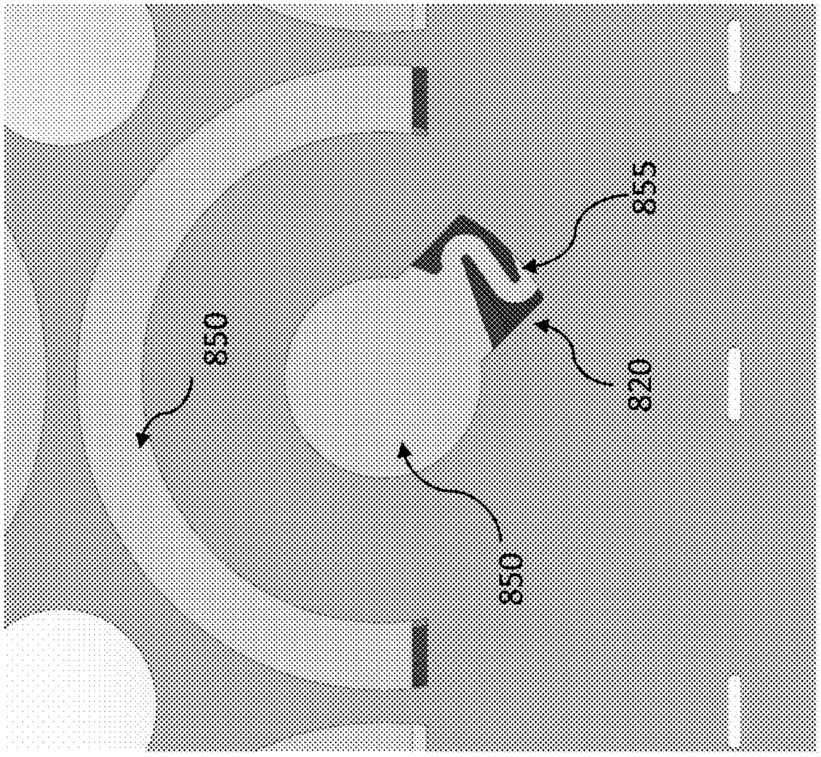

As described herein, the laser welding process can facilitate the addition of a fuse between an individual cell and the conductive connection material. FIGS. 8A-8B are diagrams illustrating the welding and fusing of a battery cell.

FIG. 8A depicts an exposed portion 800 of a battery cell (exposed by the top insulating layer 510). The exposed portion 800 includes a top button exposed area 810, an exposed negative case portion 830, and a fuse window 820. After the conductive material is laser welded, the battery cell 840, as shown in FIG. 8B, includes the welded conductive material 850 and a fuse 855 (e.g., in some cases like the fuse 730), which connects the top button portion to the conductive layer.

Figure 9A:
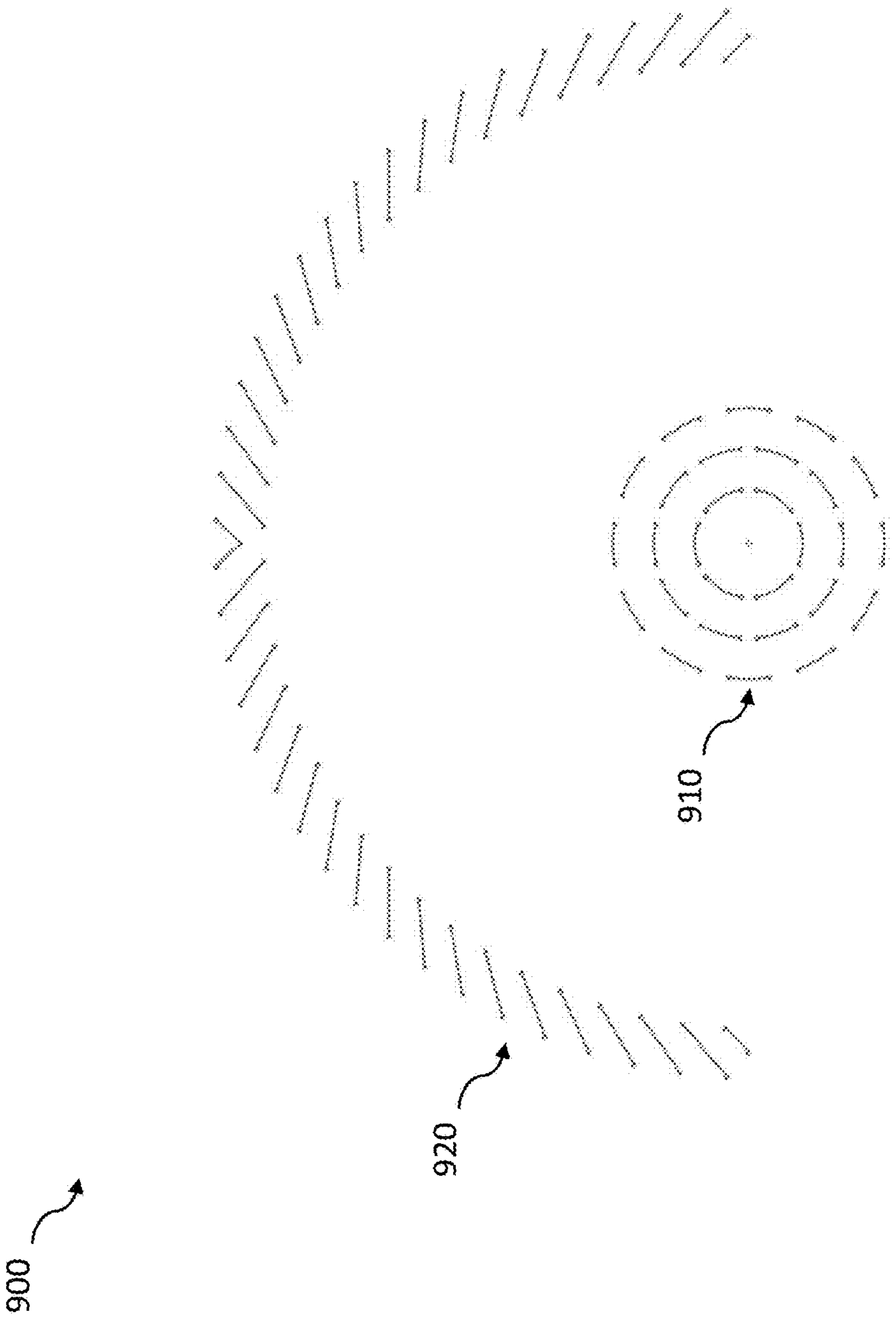
FIGS. 9A-9B are diagrams illustrating weld patterns used when laser welding a battery cell.
Figure 9B:
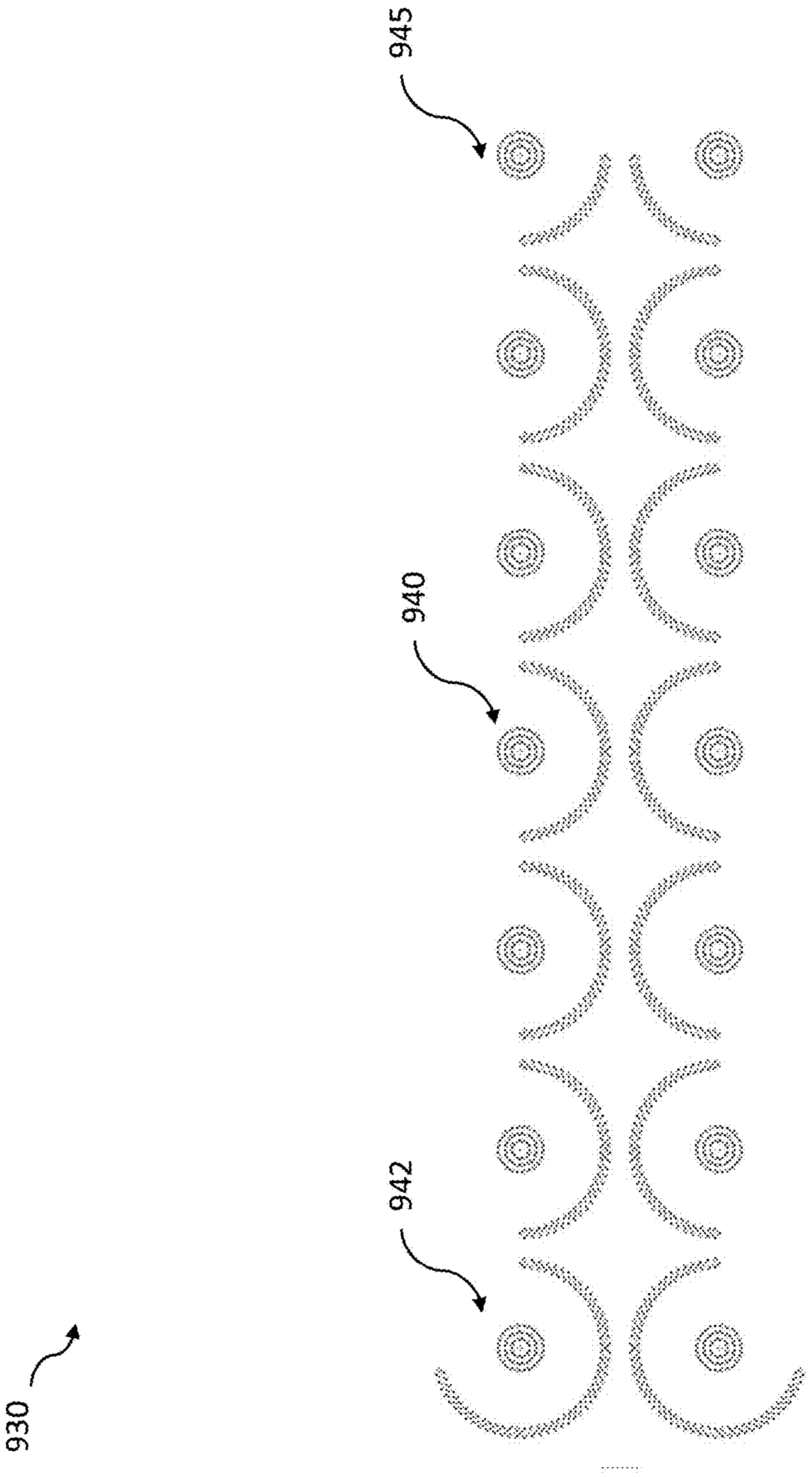

FIGS. 9A-9B are diagrams illustrating weld patterns used when laser welding a battery cell. FIG. 9A depicts a single cell 900 having angled weld patterns 910 at the positive top button area of the cell, and angled weld patterns 920 at the negative case portion of the cell. The welding pattern, as shown, is performed at an angle, to maximize the surface area of the weld. For example, welding an angled pattern enables the laser to take a direct path to the welding target (positive button or negative case), without traveling or impinging on other applied welds.

FIG. 9B depicts a group of cells 930 and different weld patterns at some of the cells. In some embodiment, the cells, as shown, can include a weld around half the cell 940, a weld around three quarters of the cell 942, and/or a weld around one quarter of the cell 945.

Figure 10:
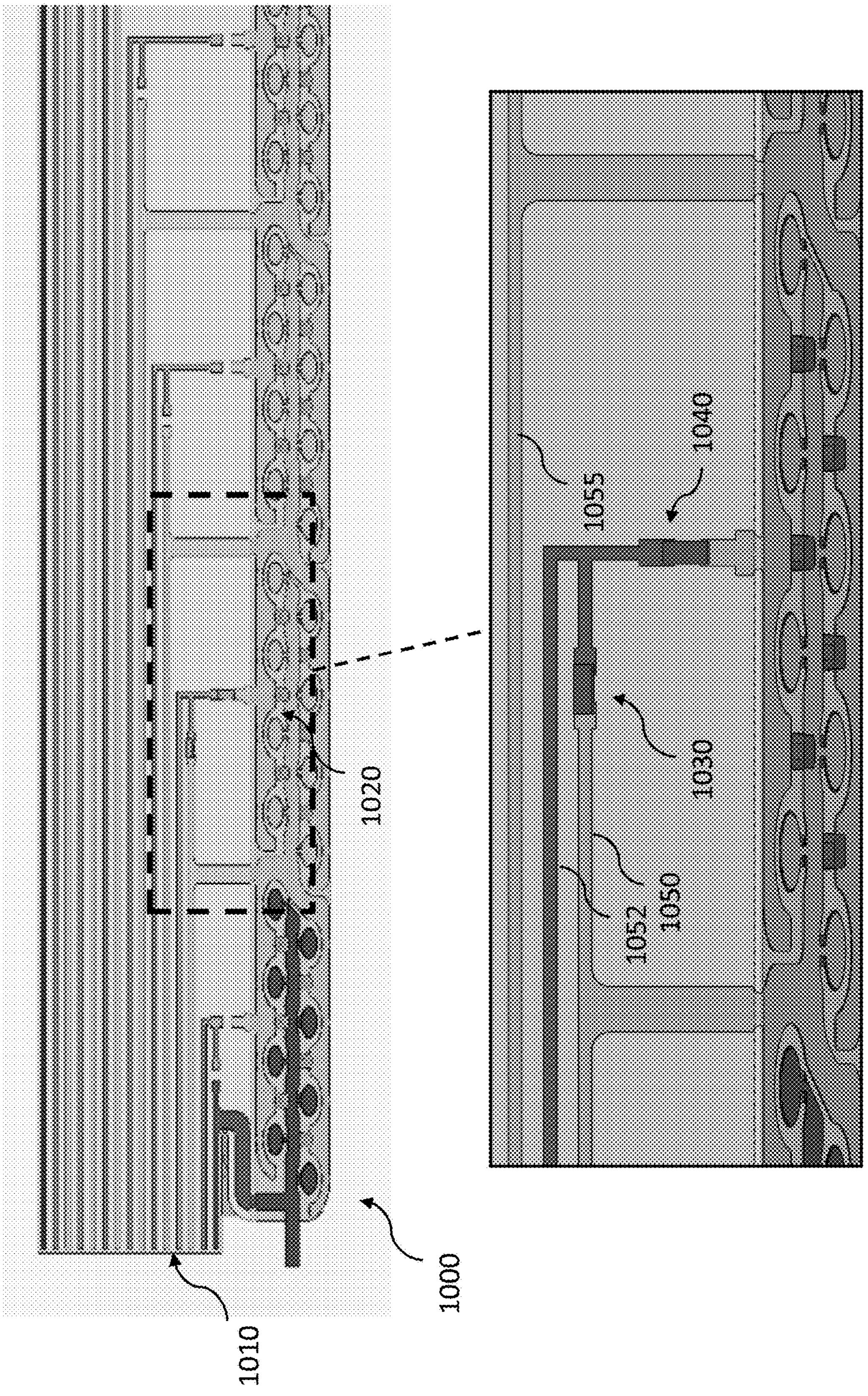
FIG. 10 is a diagram illustrating a battery pack having thermistors.

In some cases, the manufacturing process can facilitate the disposition and use of a thermistor at or near the welded cells, such as for a group of cells connected in parallel (e.g., a p-group of cells). FIG. 10 is a diagram 1000 illustrating a battery pack having thermistors. The battery pack includes a simplified configuration of traces, which extend from a battery management system (BMS, not shown) to the different battery cell groupings, such as cell grouping 1020 (e.g., a group of cells connected in parallel, or p-group). The cell grouping 1020 includes a surface mounted resistor 1030 and a surface mounted thermistor 1040.

The thermistor 1040, which can measure the temperature at the cell by supplying a constant current and detecting the change in voltage at the thermistor 1040, is connected via a trace 1052 to the BMS, which is part of a voltage divider circuit. For the voltage divider circuit, the ground is sourced directly from the measured p-group of cells and connects to one end of the thermistor 1040. A positive V-tap trace 1050 from the same p-group is connected to the resistor 1030. The two available ends of the thermistor 1040 and resistor 1030 are connected together, and the trace 1052 leads to the BMS.

The BMS measures the input voltage of the voltage divider circuit by comparing the voltage taps adjacent to either side of the voltage divider. The voltage divider outputs a variable voltage from the trace. The BMS can compare this variable voltage to the adjacent voltage taps and extrapolate a temperature present at the thermistor 1040. Thus, the on-battery circuit allows for single-wire temperature measurement by combining datasets the BMS already measures (e.g., the voltage taps).

Figure 11B:
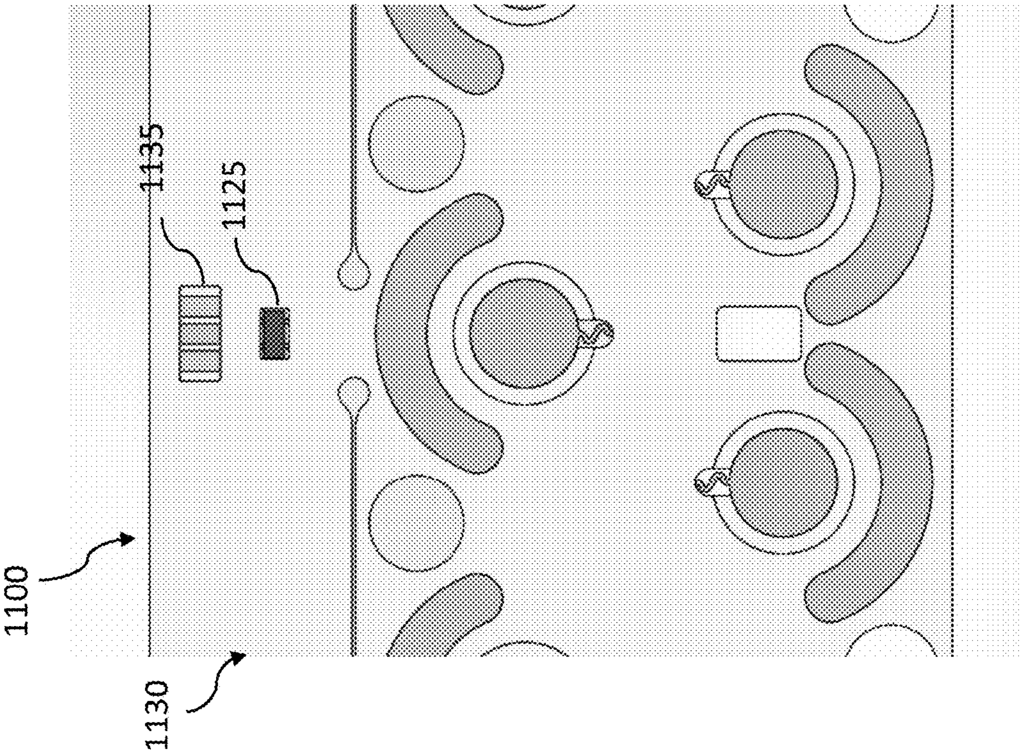
FIGS. 11A-11B are diagrams illustrating the addition of a thermistor to a fused battery cell.
Figure 11A:
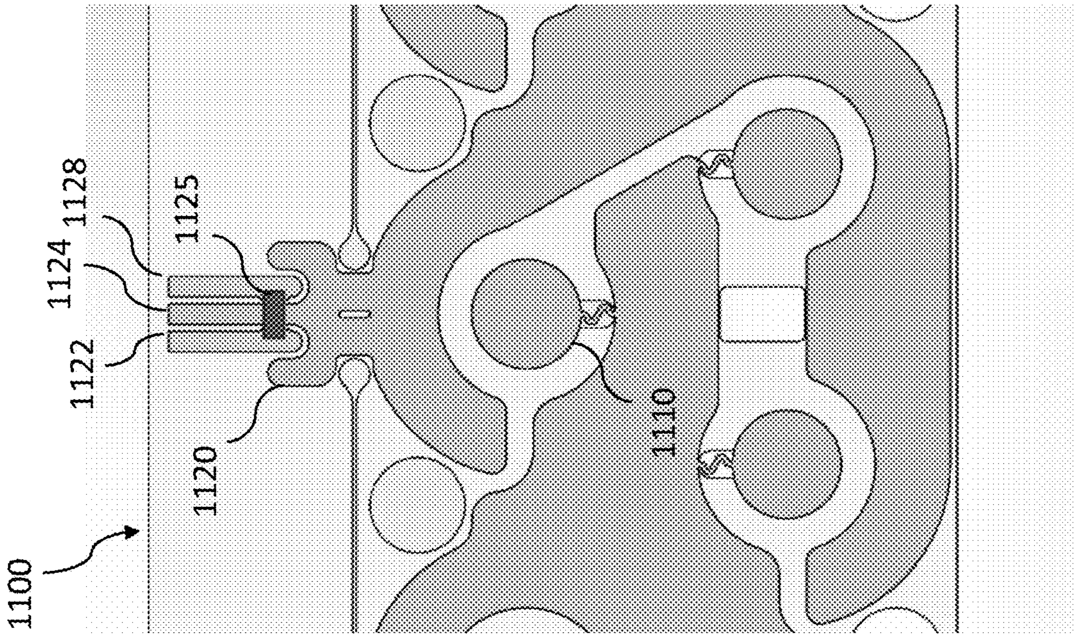

In some embodiments, the battery pack, using the welding process, can extend the interconnect material behind or below a surface mounted thermistor. FIGS. 11A-11B are diagrams 1100 illustrating the addition of a thermistor to a fused battery cell.

The battery cell includes several fused cells 1110, as well as interconnect material 1120 that extends away from the fused cells 1110, forming a trident shape. The trident shape 1120 extends under a surface mounted thermistor 1125. The thermistor 1125, and associated V-tap trace 1124, bridges across two BMS traces (e.g., Therm2 trace 1122 and Therm1 trace 1128).

The thermistor 1125, having two wires or traces 1122 and 1128, is disposed physically over a leg or trace from the interconnect material (over the trident shape 1120). The leg or trace has a direct thermal path to the connected cell 1110 (or parallel group of cells) and can approximate the temperature at the cell 1110 or grouping of cells.

In some cases, an insulating layer 1130 includes an access opening or window 1135 that provides an access connection to the traces. Using the access window 1135, a BMS or other pin connect can contact the thermistor 1125 and measure the temperature at the battery cells. Thus, in these implementations, the welding process can facilitate the disposition and/or mounting of a thermistor to a battery cell or grouping of cells when the interconnect or connection materials are welded to the battery cells, among other benefits.

Figure 12:
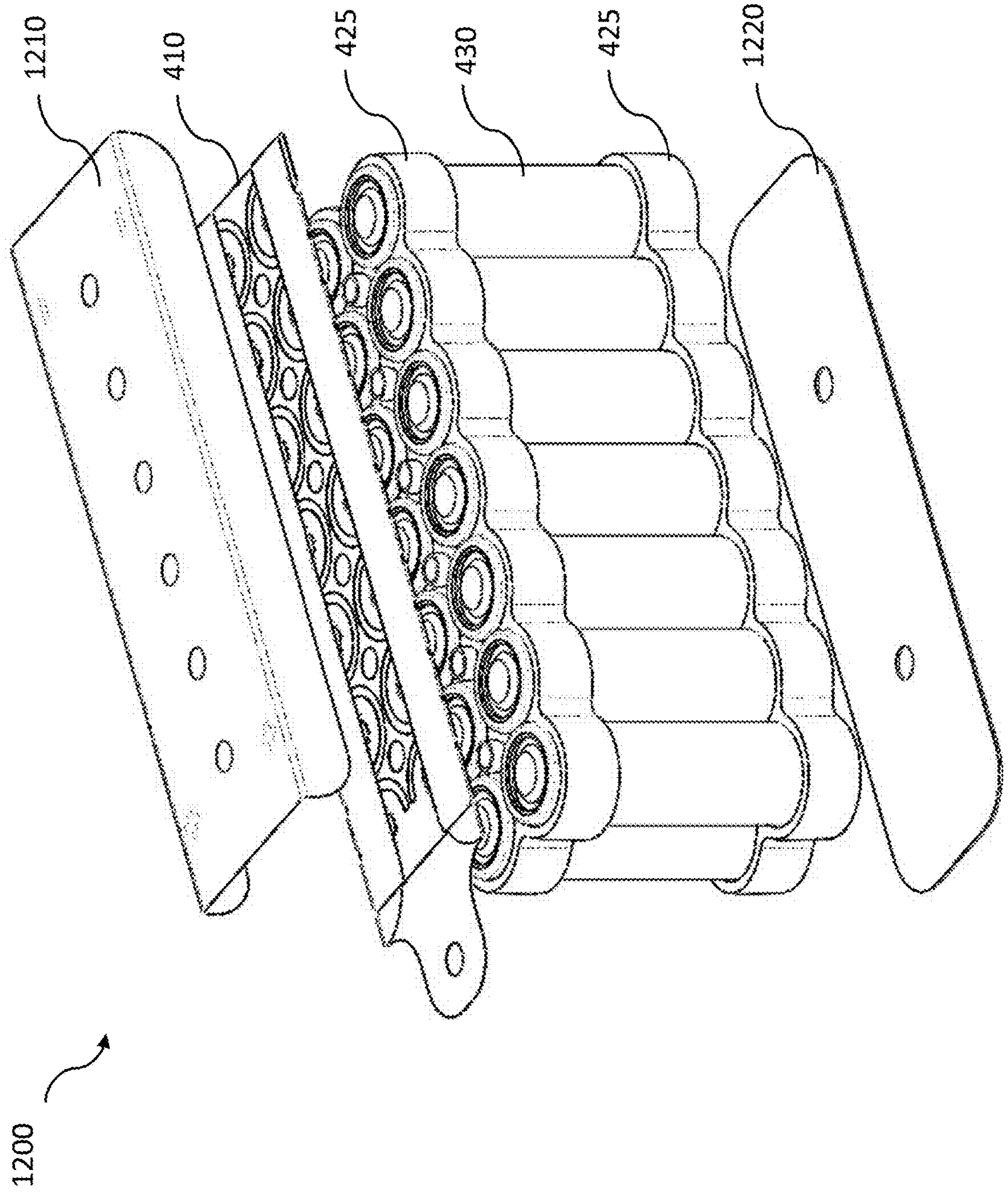
FIG. 12 is an exploded view of a battery pack capable of being coupled to a heat sink.

As described herein, in some cases, the battery pack can be configured to be coupled to a heat sink. FIG. 12 is an exploded view 1200 of a battery pack capable of being coupled to a heat sink. A top insulator 1210, such as a thermal and electrical insulator (e.g., fish paper), is disposed to the top of the battery pack (e.g., on top of the foil conductor 410).

Then, a thermally conductive insulating layer 1220 (e.g., a silicone and fiberglass composite material) is disposed below the battery cells in the battery pack. The battery pack, having the layer 1220 placed underneath, can then be coupled to a heat sink, in order to facilitate the dissipation of heat from the pack. Thus, because the cells are connected on the top portions of the cells, the bottom of the cells can be prepared and configured to transfer heat out of the pack via a coupled heat sink.

Figure 13:
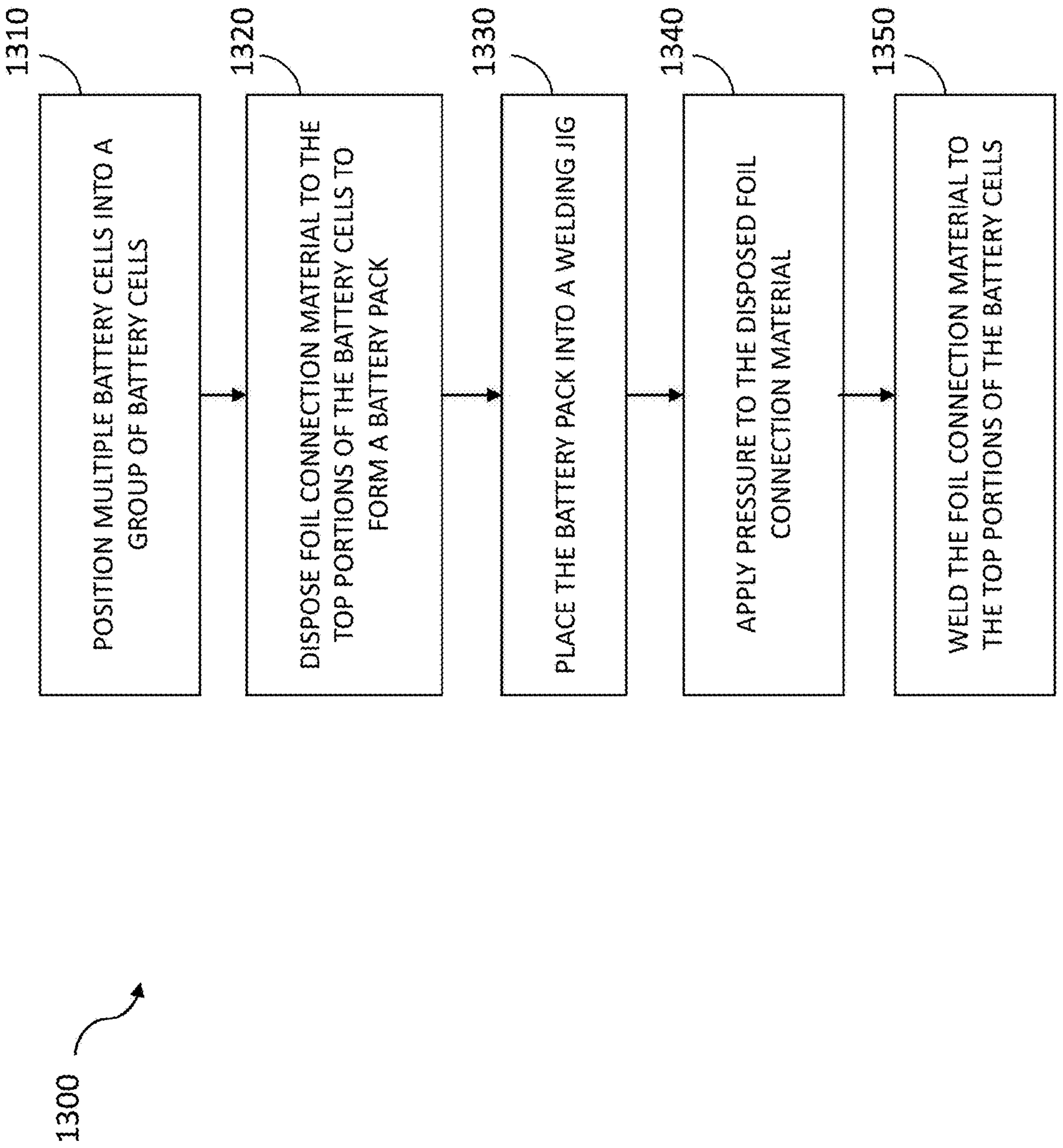
FIG. 13 is a flow diagram illustrating a method of manufacturing a battery pack of battery cells.

As described herein, various battery manufacturing processes employ the welding jig 100 described herein. FIG. 13 is a flow diagram illustrating a method 1300 of manufacturing a battery pack of battery cells.

In operation 1310, multiple cells are positioned into a group of cells. For example, the cells can be positioned into different cell configurations, and can be secured by one or more holders.

In operation 1320, foil connection material is disposed or placed onto top portions of each of the multiple battery cells of the group of battery cells. As described herein, the foil connection material 410 can be several underlying materials. Example materials include copper clad aluminum, copper coated aluminum, and other multiple layered or alloyed thin metal films. For example, the process can utilize dissimilar metals, such as nickel-plated or nickel-coated steel cells with copper plated aluminum connectors, as well as similar materials, such as aluminum cased cells.

In operation 1330, the battery pack is placed into a welding jig. For example, once the foil connector 410 is positioned onto the battery cells 430, the top plate 110 is moved down towards the battery cells, where the conforming layer 210, disposed under the top plate 210, contacts and is pressed into the foil connector 410. The top plate 110 is then secured in the pressed position.

In operation 1340, pressure is applied to the disposed foil connection material using a top plate of the welding jig. For example, when the top plate 110 is latched and the battery pack is fixed into the welding jig 100, the foil connector 410 is pressed into the tops of the battery cells by the conforming material 210, as described herein.

In operation 1350, the disposed foil connection material is laser welded to the top portions each of the multiple battery cells of the group of battery cells. In some cases, welding the disposed foil connection material to the top portions of each of the multiple cells includes welding the foil connection material to a positive button top and a negative case of the top portions of each of the multiple cells of the group of cells.

In some cases, fusing the disposed foil connection material to the tops of each of the multiple cells of the group of cells including laser welding the disposed foil connection material to the tops of each of the multiple cells of the group of cells. For example, the manufacturing process can include positioning multiple battery cells into a group of battery cells, disposing a foil connector onto a top portion of each battery cell of the group of battery cells, pressing a conforming material onto the disposed foil connector, and welding the foil connector to the group of battery cells. For example, the process can place the battery pack within a welding jig and press the conforming material onto the disposed foil connector using a top plate of the welding jig.

Thus, in various embodiments and/or implementations described herein, the welding jig 100 and its components enable the laser welding of connection materials (e.g., conductive foils) to a group of battery cells for a battery pack, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the technology is not intended to be exhaustive or to limit the technology to the precise form disclosed above. While specific implementations of, and examples for, the technology are described above for illustrative purposes, various equivalent modifications are possible within the scope of the technology as those skilled in the relevant art will recognize.

In addition, while processes are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and technology provided herein can be applied to other systems, not necessarily the technology described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms.

Accordingly, the actual scope of the invention encompasses not only the disclosed implementations, but also all equivalent ways of practicing or implementing the invention under the claims.

We claim:

1. A method of manufacturing a battery pack, the method comprising:

positioning multiple battery cells into a group of battery cells;

disposing foil connection material onto top portions of each of the multiple battery cells of the group of battery cells to form a battery pack, wherein the foil connection material includes a top insulating layer, a middle copper coated aluminum layer, and a bottom insulating layer, and wherein the top insulating layer and the bottom insulating layer includes openings that expose the middle copper coated aluminum layer;

placing the battery pack within a welding jig;

applying pressure to the disposed foil connection material using a top plate of the welding jig, wherein the top plate includes angled cutouts that expose the disposed foil connection material; and welding the disposed foil connection material to the top portions of each of the multiple battery cells of the group of battery cells by laser welding the disposed foil connection material at different angles via angled sides of the angled cutouts of the top plate.

2. The method of claim 1, wherein welding the disposed foil connection material to the top portions of each of the multiple battery cells includes welding the foil connection material to a positive button top and a negative case of the top portions of each of the multiple battery cells of the group of battery cells.

3. The method of claim 1, wherein welding the disposed foil connection material to the top portions of each of the multiple battery cells of the group of battery cells includes laser welding the disposed foil connection material to the top portions of each of the multiple battery cells of the group of battery cells.

4. The method of claim 1, wherein applying pressure to the disposed foil connection material using a top plate of the welding jig includes:

placing a conforming material between the top plate of the welding jig and the disposed foil connection material; and applying the pressure to the disposed foil connection material via the conforming material such that the conforming material contacts the foil connection material.

5. The method of claim 1, further comprising:

welding a fuse between the top portions of each of the multiple battery cells of the group of battery cells and the foil connection material.

6. The method of claim 1, further comprising:

surface mounting a thermistor to each of the multiple battery cells of the group of battery cells.

7. The method of claim 1, further comprising:

extending the foil connection material away from the multiple battery cells of the group of battery cells; and surface mounting a thermistor to each of the multiple battery cells of the group of battery cells on top of the extended foil connection material.

8. The method of claim 1, wherein the battery cells are 18650 form factor Lithium-ion battery cells.

9. A method of manufacturing a battery pack, the method comprising:

positioning multiple battery cells into a group of battery cells;

disposing a foil connector onto a top portion of each battery cell of the group of battery cells, wherein the foil connector includes a top insulation layer, a middle layer of aluminum, and a bottom insulation layer, and wherein the top insulation layer and the bottom insulation layer both include openings that expose the middle layer of aluminum;

pressing a conforming material onto the disposed foil connector using a top plate of a welding jig; and laser welding the disposed foil connector to the group of battery cells at different angles via angled sides of angled cutouts of the top plate.

10. The method of claim 9, wherein laser welding the disposed foil connector to the group of battery cells includes welding the disposed foil connector to a positive button top and a negative case of the top portions of each battery cell of the group of battery cells.

11. The method of claim 9, further comprising:

welding a fuse between the top portions of multiple battery cells of the group of battery cells and the disposed foil connector.

12. The method of claim 9, further comprising:

surface mounting a thermistor to each battery cell of the group of battery cells.

13. The method of claim 9, wherein the battery cells are 18650 form factor Lithium-ion battery cells.

* * * * *